Nov. 20, 1928.  
W. H. FULTON  
UNIVERSAL GREASE GUN  
Filed Dec. 12, 1921
1,692,255
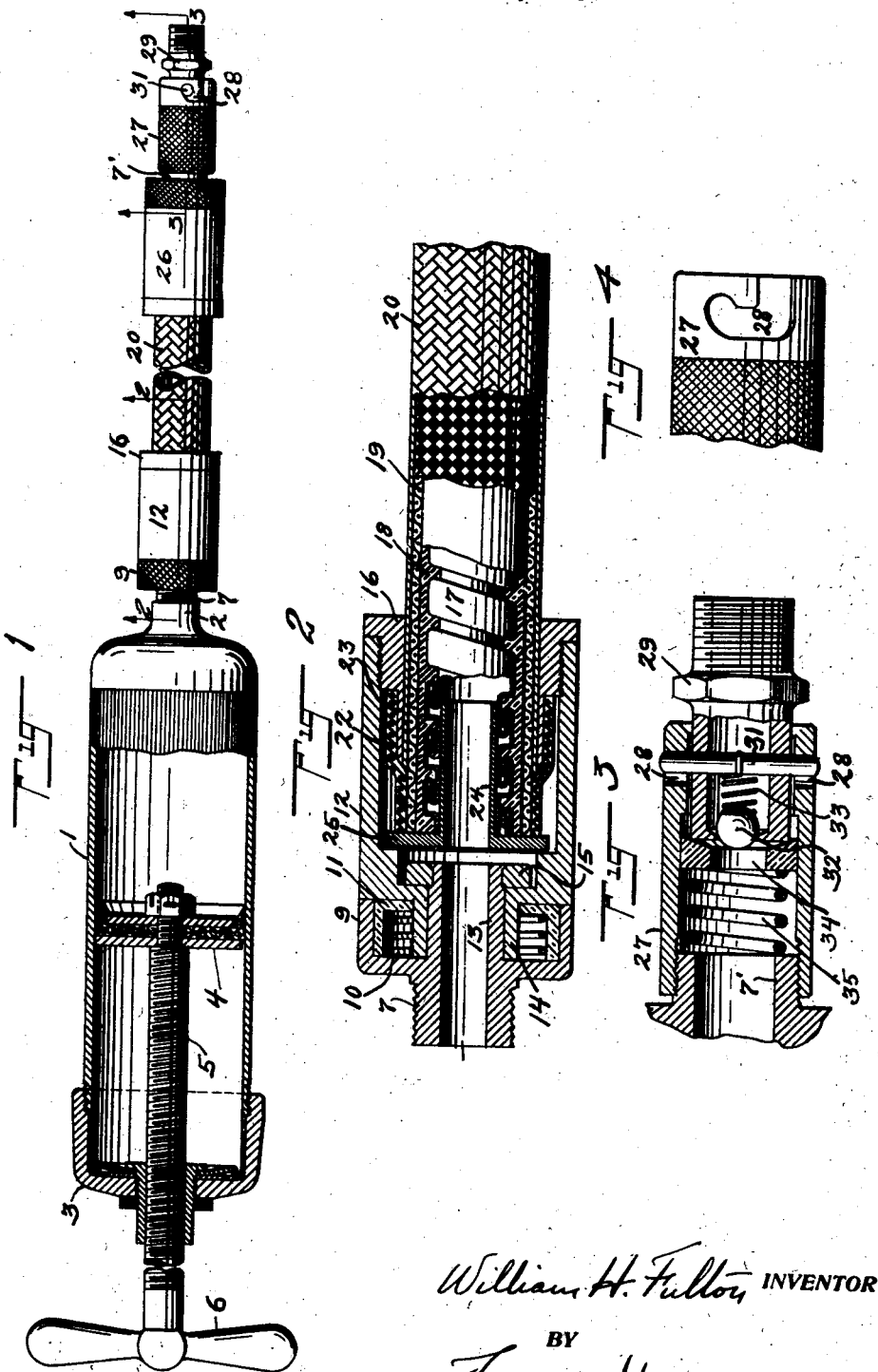

Patented Nov. 20, 1928.

1,692,255

UNITED STATES PATENT OFFICE.

WILLIAM H. FULTON, OF IRVINGTON, NEW JERSEY, ASSIGNOR, BY MESNE ASSIGNMENTS, TO TITEFLEX METAL HOSE CO., A CORPORATION OF NEW JERSEY.

UNIVERSAL GREASE GUN.

Application filed December 12, 1921. Serial No. 521,606.

This invention relates to apparatus for supplying grease to bearings and which are known as grease guns.

Grease guns are used to a large extent in connection with automobiles because they provide a ready and cleanly lubricating means as well as a neat package for the grease.

The grease holes of many bearings are so located that in order for the gun to be universally applicable to them, the container of the gun must comprise a flexible outlet. The trouble with this is that means for rendering the gun adaptable to the variously located grease holes has not been consistent with suitable grease resistant qualities with the result that attempts in the direction indicated have been unsatisfactory.

The main object of the present invention is to provide a grease gun universally adaptable to variously located grease holes and which shall possess suitable grease resisting properties.

Metal is suitably grease resisting and the reservoir is commonly made of such material but difficulty is encountered with the universally applicable outlet. A continuous metal tube of sufficient thinness to provide the desired flexibility is so fragile that it is incapable of withstanding the repeated bendings and stresses occasioned in the use of the grease gun and is practically prohibited from such use. A rubber conduit possesses the necessary flexibility and tightness, but is vulnerable to attack by the grease, rubber deteriorating quite rapidly when in contact with grease so that if subjected to any bending or stresses the conduit formed of such material soon becomes useless. Metal conduits formed of helically arranged strip are sufficiently flexible and grease resistant, but, especially where rendered flexible by sliding in the seam or where the convolutions loosely fit together, there is sometimes, under the high pressure exerted upon the grease, a small amount of grease forced outwardly between the convolutions thereby rendering the gun uncleanly and unsatisfactory.

According to the present invention a grease gun is provided having a universally applicable outlet comprising a flexible metal conduit presented to the grease and extending substantially throughout the flexible portion of the outlet, and about this flexible metal conduit is placed a rubber covering which permit flexing and, for instance where the metal conduit is formed by helically disposed strip as above referred to, the rubber covering prevents any grease which may exude between the convolutions from reaching the exterior of the gun and at the same time the rubber tube or covering is shielded to a great extent from the deleterious action of the grease so that a practicable grease gun with a universally adaptable outlet is provided.

The outlet comprising a metal inner tube surrounded by a rubber outer tube as described, particularly where the metal tube is formed of helically disposed strip, is vulnerable to longitudinal stresses tending to elongate the conduit and also to torsional stresses tending to twist the conduit. Such action is liable to start or open wider any openings between the convolutions so that in addition to the mechanical injury which may be done to the tube by such stresses and strains, the grease upon the interior may exude between the convolutions against the rubber coating and so cause a more rapid deterioration. To relieve against this I prefer to place about the outlet formed of the interior metal conduit and rubber covering, one or more strands secured at their ends to the couplings and wound helically about the conduit. If these strands are wound in opposite directions and braided together sightly, braided covering for the conduit is produced which reinforces the conduit against elongation and prevents twisting in either direction.

The result is a universally applicable grease gun which is durable and neat.

Other and ancillary objects of the invention will appear hereinafter.

In the accompanying drawings which illustrate the invention:

Fig. 1 is a side elevation of a grease gun partly broken away and with the reservoir partly in section;

Fig. 2 is a section on the line 2—2 of Fig. 1 on an enlarged scale;

Fig. 3 is a section on the line 3—3 of Fig. 1 upon the same scale as Fig. 2; and Fig. 4 is a side elevation of a fragment of the apparatus of Fig. 3 as will be hereafter referred to.

Referring to the drawings the reservoir comprises a metal container 1 having at one end an interiorly threaded nipple 2 and at the other end a cap 3 closing the end of the reservoir. Within the reservoir slides a piston 4 secured to the end of a screw-threaded rod 5. This rod is mounted in screw-threaded engagement with the cap 3 and is caused to move longitudinally and thus move the piston 4 back and forth by turning the screw 5 in one direction or the other (that is to make room for the grease or to expel it) by means of a handle 6 upon the exterior of the casing.

The construction of the outlet and its incorporation into the gun may be described as follows:

Within the threaded central opening 2 which communicates with the interior of the reservoir 1 is screwed a nipple 7 having a grease opening 8 and a petticoat 9 within which a spring 10 presses packing 11 against the body 12 forming the other member of a swivel coupling formed by the sleeve 13 extending within the bearing 14 upon the body 12 and having a head 15 preventing withdrawal of the sleeve 13 from the bearing so that a swivel coupling is formed between the body 12 and the member having the sleeve 13. Screwed within the end of the body 12 is a hollow plug 16 to which the flexible outlet, rendering the grease gun universally applicable to variously located grease holes, is secured. Within the plug 16 is entered a flexible conduit comprising the interior metal tube 17, formed of a helically disposed strip and having the edges of adjacent convolutions interfolded with clearances such that the interfolded parts may slide and thus permit the tube to bend. About this metal tube is vulcanized a rubber coating or tube 18 which is vulcanized on to the metal tube under pressure and preferably a textile fabric 19 is pressed into the rubber during the vulcanizing operation although this is not essential. About the rubber coating are wound in opposite directions metal strands which are braided together so as to form a braided covering 20 of strands helically wound about the rubber coating, some in one direction and some in the other. This braided or interwoven covering 20 at one end has its strands sweated or soldered to the plug 16. The rubber covering and the metal conduit within it project beyond the inner end of the plug and the projecting portion is engaged by a rubber band 22 which surrounds it and a tubular portion 23 on the plug, being forced against them to seal the joint by its elasticity.

To reinforce the tube and hold it in position a ferrule 24 is inserted in the end of the tube. This ferrule has a flange 25 of sufficient width to cover the end of the tube and form a guard to prevent entrance of grease between the layers.

At the other end of the outlet is a swivel coupling 26 to which the tube formed of the inner metal conduit, the rubber coating and the metal outer braided covering are secured.

This coupling is precisely the same as that to which the other end of the tube is secured and the tube is secured thereto in precisely the same way so that no further description of it is required.

The threaded nipple 7' is screwed into a sleeve 27 and at the other end of the sleeve are formed bayonet slots 28 for removably securing the sleeve to a plug or nipple 29 adapted to be screwed into a grease hole. Extending diametrically through the plug 29 is a bar 31 which projects beyond the outer sides of the plug and forms projections for engaging in the bayonet slots to secure the gun outlet to the nipple 29. Seated in an opening at one end of the nipple 29 so as to form a check valve for preventing grease from moving outwardly from the nipple but permitting it to pass inwardly, is a ball 32 pressed against its seat by a spring 33.

Within the sleeve 27 is a hollow plunger 34 pressed against the end of the nipple 29 to make a tight joint when the nipple is secured within the sleeve, by a spring 35.

All of the parts are of metal except the usual leather washer in the piston 4, the coating 18, fabric 19, and the band 22.

It will thus be seen that there is provided a universally applicable grease gun which is tight and is comparatively invulnerable to the grease and which also is reinforced against damage by the peculiar pulling and twisting incident to the use of the gun in supplying grease.

While the invention has been illustrated in what is considered its best application it may have other embodiments without departing from its spirit and is not therefore limited to the structure shown in the drawings.

What I claim is:

1. An outlet for a universal grease gun having a grease reservoir and means for forcing the grease from said reservoir, said outlet having a flexible grease resistant conduit and a covering fluid tight and flexible but less resistant to grease than said conduit.

2. An outlet for a universal grease gun having a grease reservoir and means for forcing the grease from said reservoir, said outlet having a flexible grease resistant conduit, a covering fluid tight and flexible but less resistant to grease than said conduit and means about said fluid tight covering for securing to the ends of said outlet for resisting tensile strains of said outlet.

3. An outlet for a universal grease gun having a grease reservoir and means for forcing the grease from said reservoir, said outlet having a flexible grease resistant conduit, a covering fluid tight and flexible but less resistant to grease than said conduit and means about said fluid tight covering for securing to the ends of said outlet for resisting tensile and torsional strains of said outlet.

4. An outlet for a universal grease gun having a grease reservoir and means for forcing the grease from said reservoir, said outlet having a flexible metal conduit formed of a helically disposed strip, and a rubber covering for said conduit.

5. An outlet for a universal grease gun having a grease reservoir and means for forcing the grease from said reservoir, said outlet comprising a metal conduit formed of a helically disposed strip, a rubber covering for said conduit and helically disposed strands about said rubber covering adapted to be secured to the ends of the outlet.

6. An outlet for a universal grease gun having a grease reservoir and means for forcing the grease from said reservoir, said outlet comprising a metal conduit formed of a helically disposed strip, a rubber covering for said conduit and oppositely wound helical strands about said rubber covering adapted to be secured to the ends of the outlet.

In testimony whereof I have signed this specification this seventh day of December, 1921.

WILLIAM H. FULTON.